United States Patent [19]
Hubbard et al.

[11] Patent Number: 5,975,533
[45] Date of Patent: Nov. 2, 1999

[54] LABYRINTH-TYPE SEAL FOR RAILWAY CAR JOURNAL BEARING

[75] Inventors: Paul A. Hubbard, Richmond; Kurt W. Fisher; Andrew J. Sklute, both of Chester, all of Va.

[73] Assignee: Brenco, Incorporated, Petersburg, Va.

[21] Appl. No.: 08/928,482

[22] Filed: Sep. 12, 1997

Related U.S. Application Data

[60] Provisional application No. 60/025,897, Sep. 13, 1996.
[51] Int. Cl.[6] .............................. F16C 33/72; F16C 33/80; F16J 15/453
[52] U.S. Cl. .......................... 277/351; 277/412; 277/565
[58] Field of Search .................................... 277/351, 356, 277/411, 412, 565, 571; 384/423, 594, 595

[56] References Cited

U.S. PATENT DOCUMENTS

| | | |
|---|---|---|
| 1,140,375 | 5/1915 | Hess . |
| 1,708,710 | 4/1929 | Vincent ............................... 277/412 X |
| 1,908,956 | 5/1933 | Chievitz ............................... 277/356 X |
| 2,014,859 | 9/1935 | Mitchell . |
| 2,017,731 | 10/1935 | Pascoe ............................... 277/356 X |
| 2,486,123 | 10/1949 | Cottrell ............................... 277/356 X |
| 2,583,671 | 1/1952 | Schmitter ............................ 277/412 X |
| 2,819,100 | 1/1958 | Peterson ............................. 277/351 X |
| 3,198,318 | 8/1965 | Brown . |
| 3,628,837 | 12/1971 | Otto et al. . |
| 3,679,277 | 7/1972 | Dohmen . |
| 3,741,614 | 6/1973 | Judge ..................................... 308/180 |
| 4,438,990 | 3/1984 | Schalk et al. ......................... 308/87.1 |
| 4,671,682 | 6/1987 | Yoshihara ............................. 384/484 |
| 4,770,424 | 9/1988 | Otto ........................................ 277/25 |
| 4,770,548 | 9/1988 | Otto ...................................... 384/478 |
| 4,819,949 | 4/1989 | Otto ........................................ 277/29 |
| 4,892,000 | 1/1990 | Renk et al. .............................. 74/467 |
| 4,972,939 | 11/1990 | Uttke et al. ............................ 198/501 |
| 5,186,548 | 2/1993 | Sink ...................................... 384/486 |
| 5,188,214 | 2/1993 | Uttke et al. ............................ 198/501 |
| 5,259,628 | 11/1993 | Nisley ....................................... 277/9 |
| 5,289,120 | 2/1994 | Moretti et al. ......................... 324/174 |
| 5,380,102 | 1/1995 | Sink ...................................... 384/484 |
| 5,387,039 | 2/1995 | Bien .................................. 277/412 X |
| 5,511,886 | 4/1996 | Sink ...................................... 384/486 |

*Primary Examiner*—Anthony Knight
*Attorney, Agent, or Firm*—James L. Bean; Edward J. Kondracki; Kerkam, Stowell, Kondracki & Clarke, P.C.

[57] ABSTRACT

A sealed shaft bearing assembly employs a lubricant seal having a rigid seal case supporting a resilient dust seal in rubbing contact with a cylindrical surface on the shaft, and a labyrinth type primary seal between the dust seal and the interior of the seal case, with the labyrinth being defined by a stator mounted on the seal case and a rotor mounted for rotation with the shaft, and with the stator including a cylindrical tubular portion defining an elongated thin annular gap with the shaft cylindrical surface and the rotor defining an elongated thin annular gap with the outer surface of the rotor. The radial thickness and axial lengths of the thin annular gaps are such as to preclude the passage of grease type lubricant therethrough upon operation of the bearing.

12 Claims, 4 Drawing Sheets

LABYRINTH-TYPE SEAL FOR RAILWAY CAR JOURNAL BEARING

This application is directed to an invention that has been described and depicted in U.S. Provisional Application Ser. No. 60/025,897, filed Sep. 13, 1996.

BACKGROUND OF THE INVENTION

1. Field of the Invention

This invention relates to lubricant seals for rotary shafts, more particularly to an improved seal suitable for use in applications such as railway car journal bearings for retaining the lubrication in the bearing and for excluding dust and other contaminants from the bearing.

2. Description of the Prior Art

Roller bearing assemblies incorporating two rows of tapered roller bearings supported between opposed concentric races in a self-contained, pre-lubricated, sealed package for mounting onto journals at the ends of axles or shafts are well known and widely used, for example, as rail car bearings, and the present invention will be described with reference to such rail car bearings, and to seal assemblies for use in connection with such bearings, it being understood that the improved seals according to the present invention may be employed in sealed lubricated bearing assemblies of various configurations and for various uses.

Lubricant seals employed between a shaft and a cylindrical housing within which the shaft is supported for rotation by antifriction bearings frequently consist of a rigid support ring adapted to fit in fluid-tight relation within a cylindrical bore in the housing and to support a resilient elastomeric or rubber-like sealing element in fluid-tight contact with the outer cylindrical surface of the relatively rotating shaft, or with a cylindrical surface on a wear ring, bearing cone or other member supported on the shaft. When seals of this type are operated in an environment such as on a railway car axle where foreign matter such as dust, mud or water may tend to enter the bearing cavity, it is common practice to employ a secondary seal, generally referred to as a dust seal, to prevent ingress of such material (dust) into the bearing. Seal assemblies of this type are illustrated, for example, in U.S. Pat. Nos. 5,186,548 and 5,551,886.

As pointed out in the above-mentioned U.S. Pat. No. 5,186,548, continuous contact between an elastomeric seal and a rotating rail car axle can produce friction which in heavy contact seals has been known to contribute to overheating of the seal and breakdown of the lubricant. Further, seal friction may result in rolling resistance, particularly when starting a car from the rest position and when operating at low speeds. Recent improvements in railroad sealing and lubricating technology have lessened the rolling resistance and temperature effects of seals, but the industry continues to devote substantial research, effort and resources to produce a more effective and efficient seal.

It is also known to provide labyrinth-type seals for bearings supporting a shaft in a housing and examples of such seals may be found, for example, in U.S. Pat. Nos. 2,014,859; 3,198,318; 3,679,277 and 5,259,628. Such seals frequently are employed in connection with stationary equipment such as pillow blocks for motors or for conveyor rollers where access is readily available for frequent lubrication so that loss of some lubricant is not critical, or where the bearing is not subjected to extremely heavy dynamic loads which may subject the shaft to bending and consequent misalignment of the intermeshing labyrinth elements. Note, for example, U.S. Pat. No. 2,014,859 wherein helical grooves are formed on the labyrinth elements to intentionally product a pumping action deliberately pumping some lubricant from the sealed bearing to expel dust particles which may tend to migrate into the sealed area. Labyrinth seals are also frequently employed as secondary, or dust seals in combination with a resilient primary seal, but such seals generally have not been considered for application to rail car journal bearings.

The term "labyrinth" has also been employed to describe rail car bearing seals in which one or more resilient lips are spaced closely to a relatively rotating smooth surface such as a cylindrical shaft or wear ring surface on a radially extending rigid support ring element. Such seals have not provided a tortuous path for the lubricant as is generally required for a true labyrinth seal, however, and are not believed to be properly termed labyrinth seals. Examples of such seals are disclosed, for example, in U.S. Pat. Nos. 4,819,949; 4,770,548; 4,770,424; and 3,628,837.

It is, therefore, a primary object of the present invention to provide an improved bearing shaft seal assembly.

Another object is to provide a shaft seal suitable for use in connection with a railway car journal bearing or other dynamically loaded heavy duty bearing, and which employs a primary seal in the form of a labyrinth comprising a plurality of closely spaced concentric cylindrical surfaces and a secondary or dust seal spaced outboard relative to the bearing from the primary labyrinth seal.

It is another object of the invention to provide an improved rail car journal bearing seal including a labyrinth-type primary seal in combination with a resilient dust seal in contact with a cylindrical surface on the rotating axle.

Another object of the invention is to provide an improved wheel bearing seal assembly for heavy duty vehicles having improved sealing qualities and longer service life.

Another object is to provide such an improved rail car journal bearing seal assembly which produces lower rolling resistance and which operates at a cooler temperature than conventional seal assemblies.

SUMMARY OF THE INVENTION

In the attainment of the foregoing and other objects, an important feature of the invention resides in providing a rail car journal bearing assembly employing a combination seal including a labyrinth-type primary lubricant seal and a resilient lip dust seal. The combination seal comprises a rigid seal case or support ring having a generally cylindrical body portion with one open end adapted to fit within and form a lubricant-tight seal with the surface of a cylindrical bore in the outer bearing component, and an inwardly directed wall or flange having a resilient dust seal bonded to its inner peripheral edge portion. The resilient dust seal is located outwardly (relative to the bearing) from the labyrinth seal and preferably includes a primary and at least one secondary sealing lip. The primary dust sealing lip is dimensioned to be in continuous but light rubbing contact: with a relatively rotating cylindrical surface of the axle or shaft, or with a cylindrical surface of a seal wear ring or other element carried by and rotating with the axle or shaft (hereinafter, the wear ring cylindrical surface). The secondary dust seal lips are located axially inboard of the primary dust sealing lip, and preferably are dimensioned to be in closely spaced relation to but not in rubbing contact with the wear ring cylindrical surface.

The primary lubricant seal compresses a stator member including a generally cylindrical, axially extending portion within and rotatably fixed relative to the seal support ring, and a cooperating rotor element mounted on the wear ring cylindrical surface or the bearing inner cone for rotation relative to the stator member. The axially extending cylindrical portion of the stator is a relatively thin walled tubular section having an inner cylindrical surface extending in closely spaced coaxial relation with the wear ring cylindrical surface, and an outer cylindrical surface. The rotor also has a body portion, and an axial bore extends through the body portion to be received upon and rotate with a cylindrical surface on the wear ring or bearing inner cone. A thin walled tubular portion is integrally formed with the rotor body and has an inner cylindrical surface telescopingly received over and extending in closely spaced coaxial relation with the outer cylindrical surface of the tubular portion of the stator. The free end of the tubular portion of the stator terminates in spaced relation to the body portion of the rotor and the free end of the tubular section of the rotor terminates in spaced relation to the body portion of the stator whereby an elongated, narrow, tortuous open path extends from the interior of the support ring axially inwardly between the inner surface of the rotor and the outer surface of the stator, then axially outward between the inner surface of the stator and the surface of the wear ring to the dust seal. This open tortuous path provides a labyrinth seal effectively preventing semi-solid grease-type lubricant in the sealed bearing from reaching the dust seal while permitting sufficient oil (released from the grease) to migrate through the labyrinth to effectively lubricate the dust seal. A prelube of grease is provided at manufacture between the seal element and the stator to provide lubricant to the seal element during the initial "break-in" period. The non-contact labyrinth-type primary lubricant seal thereby provides a low energy seal which operates at a substantially lower temperature than conventional resilient lip lubricant seals.

BRIEF DESCRIPTION OF THE DRAWINGS

Other features and advantages of the invention will be apparent from the detailed description contained hereinbelow, taken in conjunction with the drawing in which.

DESCRIPTION OF THE PREFERRED EMBODIMENT

Figure 1:
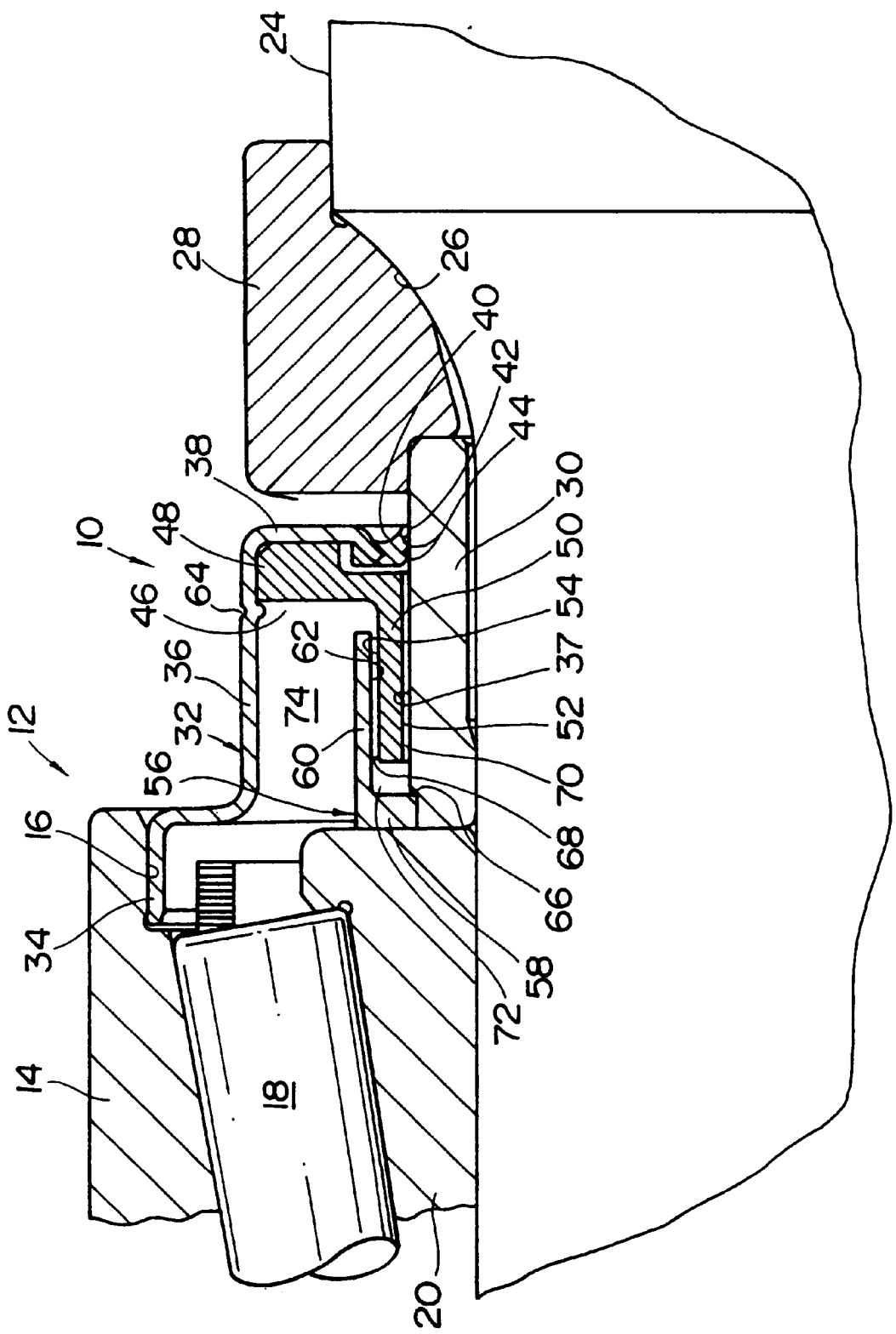
FIG. 1 is a fragmentary sectional view of a portion of a rail car bearing assembly and shaft embodying one embodiment of the improved seal of the present invention.

Referring now to the drawings in detail, the improved seal assembly according to the present invention as illustrated in FIG. 1 is designated generally by the reference numeral 10 and is shown assembled as a part of a prepackaged bearing assembly 12, only one end portion of which is shown in the drawing. The bearing assembly comprises an outer housing or cup member 14 having a cylindrical recess 16 formed in each of its open ends for receiving the seal, and provides outer races for the bearing elements 18 which, in turn, rotate on the inner races provided by cone members 20 mounted on a journal surface 22 of wheel axle 24. As is conventional, journal 22 is merged into the enlarged body of axle 24 through a smoothly contoured fillet 26 and bearing assembly 12 is positioned on the journal surface by a backing ring 28 and seal wear ring 30. Backing ring 28 has a surface contoured to fit the fillet 26 and an abutment shoulder engaging the seal wear ring 30 which, in turn, engages the inner bearing cone 20. The seal wear ring 30 has its end portion adjacent to the cone 20 dimensioned to provide an interference fit with the outer cylindrical surface of the journal 22 and bearing cone 20 also is dimensioned to provide an interference fit with the journal surface so that the inner cone 20, wear ring 30 and backing ring 28 rotate with the axle 24. A rail car bearing of this general type is shown in U.S. Pat. No. 5,380,102, reference to which may be had for a more complete description of the bearing structure.

The seal 10 includes a generally cup-shaped seal case or support ring 32 having an enlarged generally cylindrical rim portion 34 terminating in an open end received within the cylindrical bore 16 of cup 14 in fluid-tight relation, and a smaller diameter generally cylindrical body portion 36 extending axially from the bearing in outwardly spaced relation to the outer cylindrical surface 37 of wear ring 30. Body 36 terminates in a radially inwardly extending flange portion 38 having a central opening extending therethrough and a resilient elastomeric, or rubber-like dust seal element 40 is supported on the inner periphery of the flange.

Resilient seal element 40 has a first or primary dust sealing lip 42 and one or more secondary dust sealing lips 44 located axially inward (toward the bearing) from the primary dust sealing lip. The primary dust sealing lip is dimensioned to be in continuous light rubbing or sealing contact with the outer surface of the wear ring 30, while the secondary dust sealing lip or lips are dimensioned to be in closely spaced relation to, but preferably not in rubbing contact with, the wear ring. The dust seal may be substantially identical to that shown in U.S. Pat. No. 5,186,548 in which only a single secondary dust sealing lip is employed or a second dust sealing lip 44 may be employed as shown in the drawing of this application.

An insert or stator element 46 is telescopingly received and rotatably fixed within the cylindrical body portion 36 of support ring 32. In the embodiment of FIG. 1, stator 46 includes a generally cylindrical disc-like flange or body portion 48 having an outer peripheral surface dimensioned to be received in interference relation within the cylindrical body portion 36, with the end of flange 48 abutting the end wall 38. A relatively thin-walled tubular portion 50 is integrally formed on the annular flange portion 48, with the tubular portion 50 having a cylindrical inner surface 52 extending coaxially with and in closely spaced relation to the outer cylindrical surface 37 of wear ring 30 and an outer cylindrical surface 54 concentric with surface 52.

A rotor member 56 is mounted on the inner end of wear ring 30. Rotor 56 includes a body portion 58 having a central bore extending therethrough dimensioned to be telescopingly received, in interference relation, on the inner end of the wear ring and having an end surface in abutting relation with the outwardly directed end of cone 20. Rotor 56 also includes an integrally formed axially extending tubular portion 60 having a cylindrical inner surface 62 concentric with and in closely spaced relation to the outer cylindrical surface 54 of tubular stator portion 50. Tubular portions 50 and 60 are in telescoping, overlapping relation throughout a major portion of their respective lengths, with tubular portion 60 terminating in axially spaced relation to the inwardly directed end surface of the body portion 48 of stator 46, and the tubular portion 50 of stator 46 terminating in axially spaced relation to the outwardly directed surface of body portion 58 of rotor 56. If desired, the cylindrical wall 36 may be deformed, or dimpled, as at 64 to positively prevent axial movement of stator 46 within support ring 32, and a shoulder 66 may be provided on the outer circumference of wear ring 30 to axially fix the rotor 56 with respect to the wear ring 30.

Preferably, tubular portions 50 and 60 extend in overlapping relation for about one half the distance between end wall 38 and the end of cone 20 which abuts the wear ring 30. Stator 46 and rotor 56 may be formed from a rigid material such as steel or a dimensionally stable synthetic resin material.

The closely spaced relation of the cylindrical surfaces 62 and 54 provides an elongated, narrow cylindrical gap 68 therebetween and surfaces 52 and 37 similarly provide an elongated, narrow cylindrical gap 70 therebetween. Gaps 68 and 70 are in communication through the annular space 72 at the end of the body portion 50 of stator 46 to provide a continuous open path from the interior of the support ring to the dust seal, with the narrow gaps 68, 70 and the annular space 72 providing an effective labyrinth seal to prevent the escape of lubricating grease from the interior of the bearing to the dust seal. In practice, the seal wear ring 30, in cooperation with the stator and rotor, provide a reservoir 74 at the end of the bearing which, during operation, will become filled with the lubricant which is provided in the sealed assembly before the bearing is mounted on the journal. As is known, lubricant employed in railway bearings is in the form of a grease meeting the specifications prescribed by the American Association of Railroads. This grease contains sufficient congealing or thickening agents so that it is normally in a semi-solid condition. In operation of the bearing, however, sufficient oils are released from the grease to provide adequate lubrication for the bearing, and continuous rotation of the bearing tends to act as a pump circulating the lubricant over the roller surfaces toward the reservoir 74 from which the grease, and oils from the grease, migrate back into the bearing for continuously circulating lubrication. It has been found, however, that despite the release and circulation of oils, the lubricant in the portion of the seal adjacent the axially outer end of reservoir 74, i.e., adjacent the flange 48 of stator 46, tends to remain in a generally semi-solid condition. It is believed that this semi-solid condition of the lubricant, and the close spacing of the cylindrical surfaces defining the labyrinth seal, provides the surprisingly effective seal which prevents migration of the grease to the dust seal. At the same time, it has been found that sufficient oil will be released and will migrate through this passage to provide adequate lubrication for the resilient dust seal lips so that excessive heat and wear will not occur. As indicated above, lubricant provided to this area at manufacture of the assembly prevents wear and damage to the dust seal during initial operation.

The extremely heavy dynamic loading normally encountered by railway axles can result in substantial flexing of the large high strength steel shafts. Accordingly, the spacing between the cylindrical surfaces defining the labyrinth must be sufficient to accommodate this flexing without contact between the relatively rotating surfaces of the elements defining the labyrinth seal. In dynamic load testing of seals of this type on a standard railway car journal bearing, it has been determined that clearances of at least about 0.015 inches is required between cylindrical surfaces 37 and 52 and between surfaces 54 and 62 when the labyrinth surfaces extend in concentric, overlapping relation for about one half the distance between the supporting end wall and the end of the bearing cone. It has also been found that adequate sealing is provided when these clearances are increased up to about 0.040 inches, but preferably, the clearances are within the range of about 0.025 to about 0.035 inches and more preferably about 0.030 inches. When the clearance is below about 0.015 inches, rubbing contact and scoring of the surfaces has been encountered under extreme dynamic loading. The length of the cantilevered tubular segments 50 and 60 will, of course, influence the clearance required.

It has also been found that there is a relationship between the axial length of the elongated, narrow cylindrical gaps 68 and 70 and the radial thickness of these gaps required to produce an effective primary seal. Generally, shorter axial lengths may be employed for smaller radial thickness of the gaps, and it has been found that, for a railroad wheel bearing subjected to heavy dynamic loading, the ratio of the axial length of the gap to the radial thickness should be at least about 10 to 1 and preferably about 15 to 1. For example, when the radial thickness of the gaps is 0.020 inches, the axial length of the gaps should preferably be at least about 0.20 inches, while in the preferred embodiment for such a bearing seal in which the radial thickness is about 0.030 inches, the axial length should be at least about 0.30 inches.

When the clearances (gap thicknesses) are about 0.030 inches and the axial gap lengths are about 0.3 inches in a standard rail car bearing, grease from reservoir 74 has not reached the dust seal lips after extended testing, and in most tests, the grease has not migrated to the annular space 72 at the axially inner end of the cylindrical tubular portion 50. Thus, these tests have proven that the labyrinth seal provides an effective and highly efficient lubricant seal for a shaft seal bearing such as a railway car journal bearing. Further, tests have shown that such seals run substantially cooler than conventional resilient lip lubricant seals and require substantially less energy for operation. At the same time, sufficient oils released from the grease migrate through the labyrinth to reach and lubricate the dust seal, but this small quantity of oil is effectively prevented from leaking by the rubbing contact of the primary dust seal lip 42 with surface 37.

Figure 2:
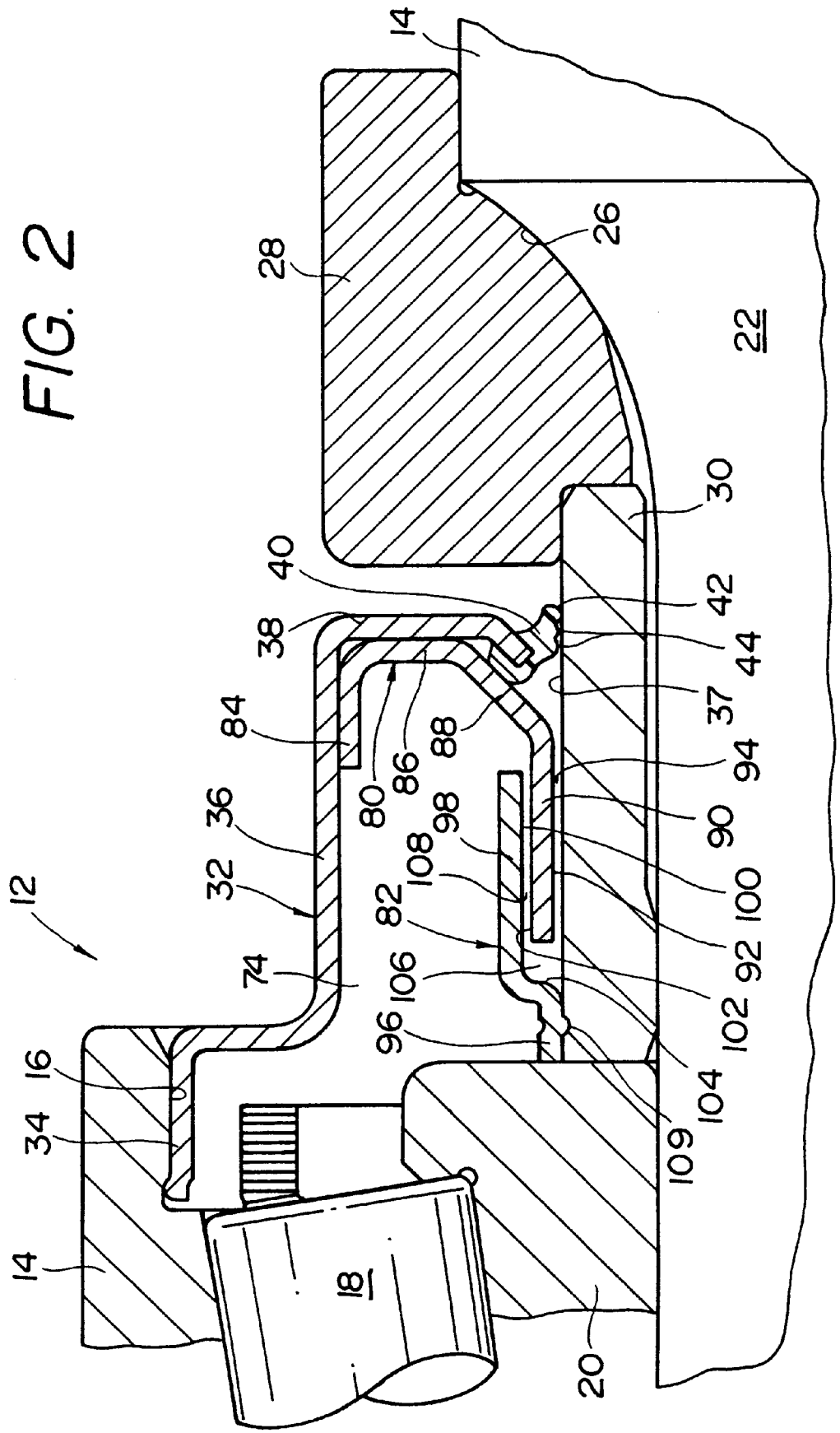
FIGS. 2–4 are views similar to FIG. 1 and showing further embodiments of the bearing and seal assembly.
Figure 3:
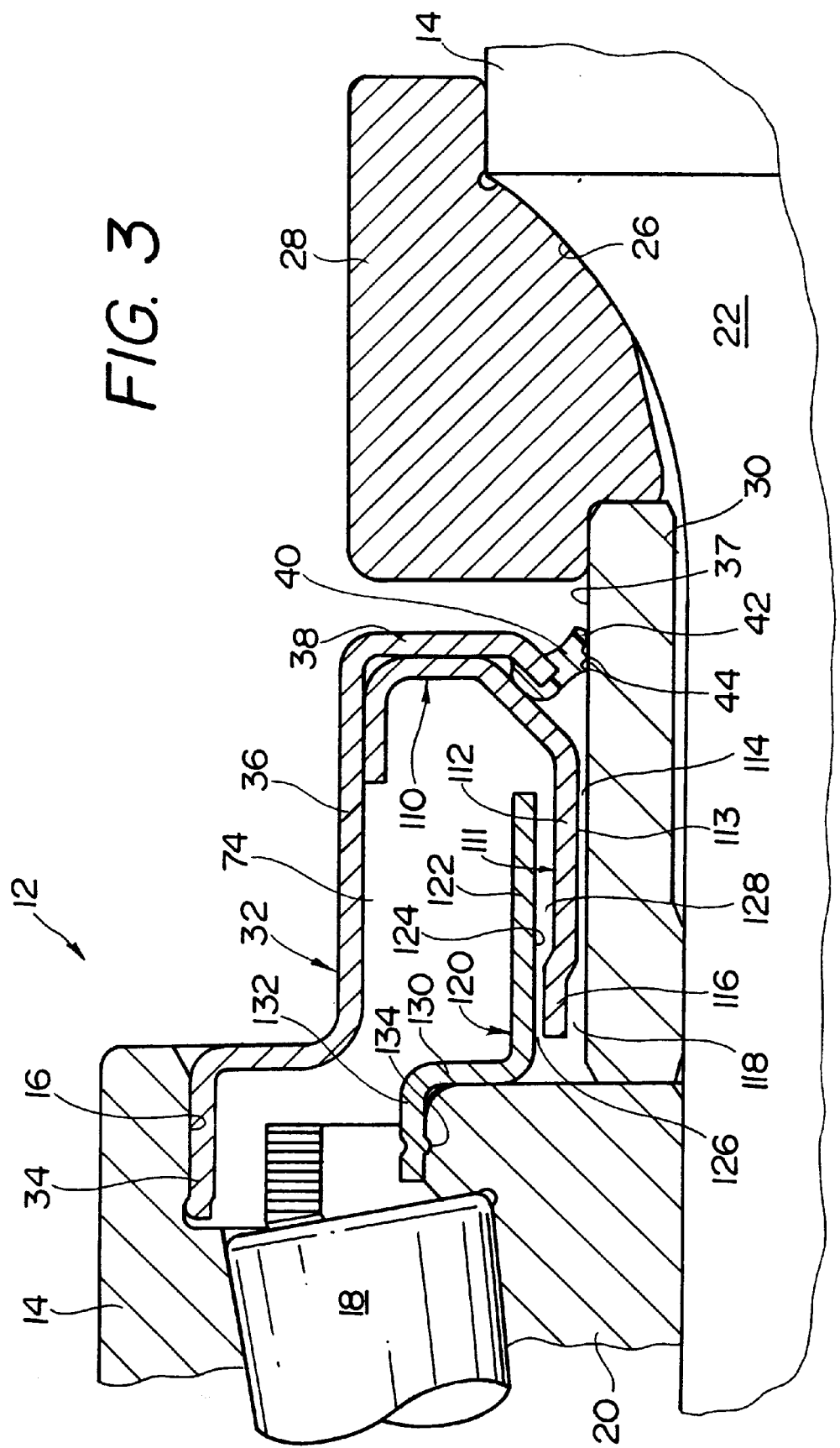
Figure 4:
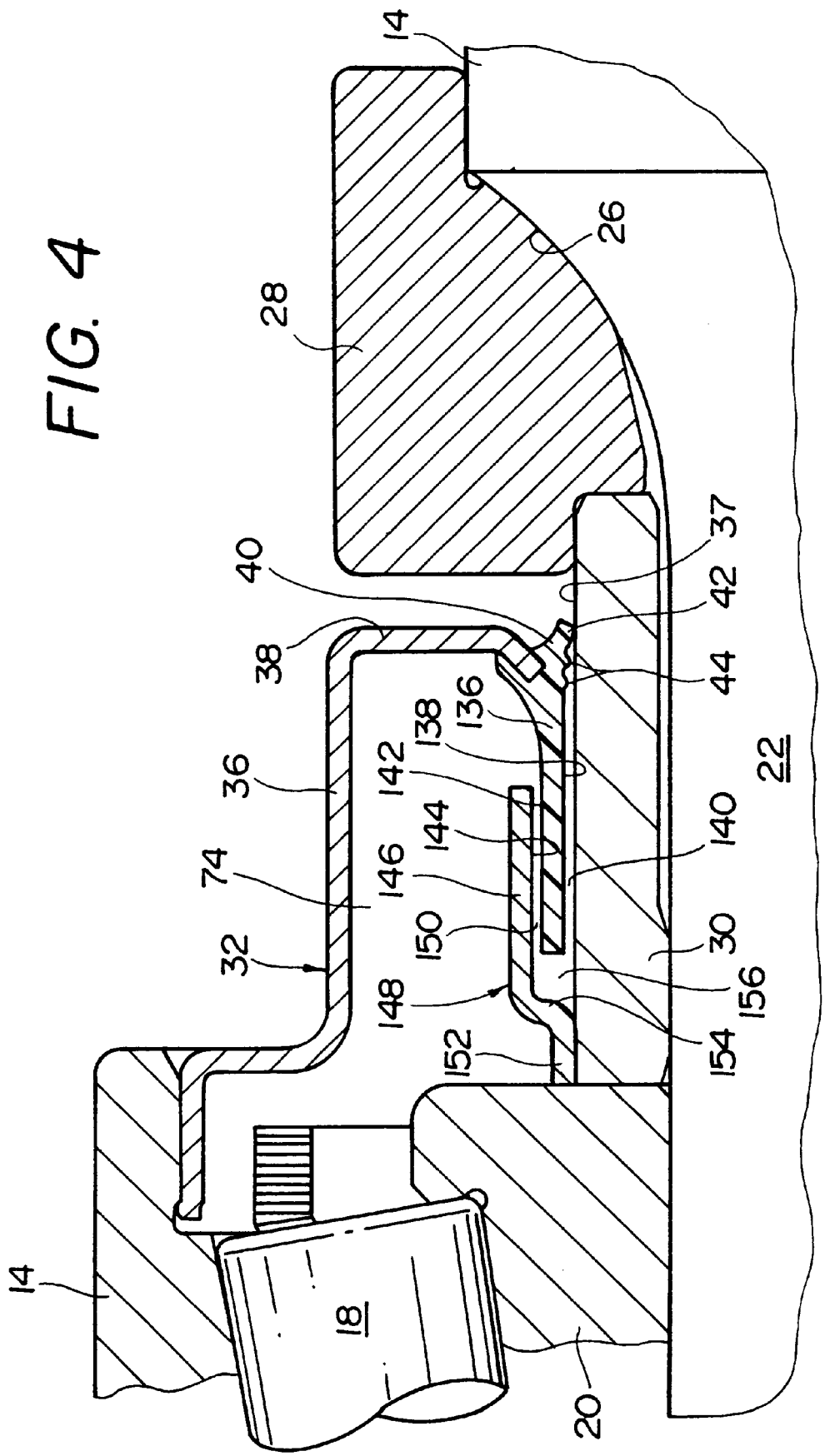

Referring now to FIGS. 2–4, alternate embodiments of the invention will be described. In each of these three embodiments, the basic bearing structure is the same as described herein above with respect to the embodiment of FIG. 1, and like reference numerals will be used in all figures to designate corresponding parts of the bearing structure.

In the embodiment illustrated in FIG. 2, the stator element 80 and rotor element 82 are each stamped or die formed from an initially substantially planar plank of sheet metal whereby the production cost may be substantially reduced over the embodiment described with reference to FIG. 1. Stator 80 has a cylindrical rim portion 84 having an external diameter dimensioned to be telescopingly received within and provide an interference fit with the cylindrical body portion 36 of the support ring 32, and an inwardly directed end wall portion 86 which abuts against the end wall 38 of the support ring. An inclined transition portion 88 leads into an axially extending, cylindrical tubular body portion 90 having an internal cylindrical surface 92 dimensioned to extend in close placed coaxial relation with the outer cylindrical surface 37 of wear ring 30 to define an elongated, narrow cylindrical gap 94 therebetween.

Rotor 82 includes a generally cylindrical annular rim 96 dimensioned to be telescopingly received in interference relation on the inner end of wear ring 30, with the inner end of rim 96 in abutting relation with the in face of cone 20. Rotor 82 also includes an integrally formed axially extending tubular portion 98 having a cylindrical inner surface 100 extending in closely space relation to and concentric with the outer cylindrical surface 102 of stator cylindrical portion 90. As described above, portions 90 and 98 of stator 80 in rotor 82 are in telescoping overlapping relation throughout a major portion of their respective lengths, with the tubular portion 90 of stator 80 terminating an axially spaced relation to a shoulder portion 104 of rotor 82 to define an annular chamber 106 communicating with the gap 94 between surfaces 37 and 92 and the gap 108 between surfaces 100 and 102.

If desired, the outer surface of wear ring 30 may be formed with a shallow annular groove spaced slightly outward from the end abutting the cone 20, and the rim 96 may be formed, as by a rolling operation, to provide an inwardly extending ridge or detent dimensioned to snap into the groove as shown at 109 when the rotor is pressed onto the wear ring, to axially fix the rotor relative to the stator. In this configuration, it is not necessary that the stator end actually abut the end face of cone 20, and this configuration may be desired to avoid end face wear of the cone during flexure of the journal portion 22 of axle 14.

In the embodiment of FIG. 3, the stator 110 is similar to stator 80 described above with respect to the FIG. 2 embodiment, with the exception that the tubular body portion 112 of stator 110 which extend in closely spaced concentric relation to the outer surface 37 of wear ring 30 includes a first smaller diameter section having an inner surface 113 which defines an elongated, narrow cylindrical gap 114 with respect to the outer surface 37 and a second slightly larger diameter portion having an inner surface defining a slightly wider cylindrical gap portion 118 with respect to surface 37.

The embodiment of FIG. 3 also illustrates a slight modification of the rotor 120, which includes an elongated tubular segment 122 having an inner surface 124 extending in concentric relation with and spaced radially outward from body portion 112 of stator 110 define a first narrow annular gap portion 126 and a slightly wider annular gap portion 128 with respect to the cylindrical outer surfaces of stator portion 116 and 112, respectively. Also, rotor 120 includes a generally radially extending flange portion 130 and an axially extending rim portion 132 dimensioned to be telescopingly received upon the outer cylindrical surface of cone 20, in interference relationship therewith, so that the cone and rotor rotate together. Also, the cone 20 may be formed with a shallow annular groove dimensioned to receive a shallow inwardly directed annular ridge in portion as shown at 134 which cooperates to define a detent axially fixing the stator and cone with respect to one another.

It has been found that the stepped gap configuration, including a slightly wider gap in communication with the reservoir 74, with the more narrow gap portions 126 and 114 may provide a more positive lubricating oil supply to the dust seal 40 while effectively preventing the more solid grease form of the lubricant from migrating to the dust seal and leaking therefrom. The relative lengths of the more narrow and wider labyrinth gap portions may, of course, be varied as desired, depending upon operating conditions and the lubricating grease employed. The radial thickness dimensions of the narrow gap portions 114 and 126 are preferably maintained within the ranges described above with respect to FIG. 1. It has been found, however, that when the wider gaps 118 and 128 are no more than about twice the radial thickness of the narrow gaps 114 and 126, the axial lengths of the narrow gaps may be slightly reduced so that the ratio of the gap length to thickness may be nearer the low end of the preferred ratio.

The embodiment of the invention illustrated in FIG. 4 differs from the embodiments of FIGS. 1–3 principally in that the stator is not a separate element, but rather is integrally formed as a part of the resilient dust seal element 40. Thus, an elongated tubular sleeve portion 136 is integrally formed on and extends axially inward toward the sealed bearing from the dust seal 40. Sleeve 136 has an inner surface 138 concentric with and spaced outwardly from the outer surface 37 to define an elongated, narrow cylindrical gap 140 therebetween. Sleeve 136 also has a cylindrical outer surface 142 dimensioned to be telescopingly received within and spaced radially inward from the inner cylindrical surface 144 of the cylindrical body portion 146 of rotor member 148 to define an elongated, narrow cylindrical gap 150 therebetween. Rotor 148 also includes a smaller diameter rim portion 152 integrally joined with the elongated cylindrical body portion 152 by a transition or flange portion 154. Rim 152 has an internal diameter dimensioned to be telescopingly received in interference relation on surface 37, although it is believed apparent that other configurations of the rotor member such as described above might be employed with the resilient sleeve stator member. The elongated resilient sleeve 136 terminates in axially spaced relation to the flange portion 154 to define an annular open space 156 in communication with the narrow gaps 140 and 150 as in each of the previously described embodiments.

The dimensions of the portions of the rotor and stator elements of the embodiments of FIGS. 2–4 and which define the elongated narrow cylindrical gaps between the rotor and the stator, and between the stator and wear ring, preferably are within the ranges described above with regard to the embodiment of FIG. 1.

It is also pointed out that the configuration of the labyrinth type seals, and the dimensioning relative to the gaps or spacings may be varied, within limits, depending upon the operating condition. For example, rail cars are operated over a wide range of temperature conditions. Also, when operated in extreme cold conditions, synthetic greases such as the polyurea type greases are preferred for use with bearings employing the labyrinth seals of the present invention. Older type lubricants commonly used in rail car bearings may become very viscous and stiff when operated in extreme cold conditions so that, although the labyrinth seal would remain effective in preventing leakage, an increase in power required to overcome seal resistance might be encountered with such greases.

While preferred embodiments of the invention have been illustrated and described, it should be understood that the invention is not limited thereto, but rather that it is intended to include all embodiments which would be apparent to one skilled in the art and which come within the spirit and scope of the invention.

What is claimed is:

1. In a sealed bearing assembly including a bearing housing have at least one outer bearing race therein and a cylindrical bore extending into each end thereof outboard of and coaxial with the outer race, a shaft having a cylindrical surface thereon, bearing cone means mounted on the shaft cylindrical surface for rotation therewith, an inner race on the bearing cone means spaced generally radially inwardly from each said at least one outer race, friction bearing means between the inner and outer races, and a lubricant seal assembly at each end of the bearing assembly cooperating with the bearing housing and the shaft cylindrical surface defining an enclosure retaining a grease type lubricant in the bearing assembly, each said seal assembly comprising, a cup-shaped seal case having a generally cylindrical body with an open end mounted in one of said cylindrical bores and an end wall spaced outwardly of said housing from the open end, the end wall having an opening therein coaxial with and spaced from said shaft cylindrical surface, a resilient ring-shaped dust seal mounted on said seal case end wall, said dust seal including a resilient sealing lip dimensioned to provide light rubbing contact with said shaft cylindrical surface, and a labyrinth type primary grease seal between said dust seal and a grease type lubricant within said enclosure, the labyrinth seal including a rotor and a stator mounted within said seal case and each including an elongated tubular body portion having an open end, said stator tubular body portion having a cylindrical inner surface extending coaxially with and in closely spaced relation to said shaft cylindrical surface to define a first thin, axially extending annular gap and having a second end opposite its open end, said second end being fixedly mounted in fluid-tight relationship on said seal case, said rotor tubular body portion having a cylindrical inner surface telescopingly received over said stator tubular body portion to define a second thin, axially extending annular gap and having a second end opposite its open end, said second end being mounted in fixed fluid-tight relationship with said inner race for rotation therewith, said first and second annular gaps being in fluid communication with one another at the open end of said stator tubular body and said second annular gap being in fluid communication with the interior of said seal case at the open end of said rotor tubular body, the radial thickness and axial length of said first and second gaps being dimensional to preclude the flow of semi-solid grease lubricant therethrough to the dust seal while permitting sufficient oil to migrate therethrough to lubricate said dust seal lip.

2. The sealed bearing assembly defined in claim 1 wherein the radial thickness of said first and second gaps are each between about 0.015 to about 0.040 inches.

3. The sealed bearing assembly defined in claim 2 wherein the axial length of each said gap is at least about 10 times its radial thickness.

4. The sealed bearing assembly defined in claim 1 wherein said stator further comprises a stator mounting flange integrally formed with its said tubular body portion and rigidly mounted within said cup-shaped seal case.

5. The sealed bearing assembly defined in claim 4 wherein said rotor comprises a rotor mounting flange integrally formed with said tubular body portion, said rotor mounting flange supporting said rotor for rotation with the shaft.

6. The sealed bearing assembly defined in claim 5 wherein said shaft cylindrical surface comprises a cylindrical outer surface on a wear ring mounted on the shaft for rotation therewith, said wear ring having an end wall in fluid-tight abutting relationship with said bearing cone rotor, and wherein said mounting flange is mounted in fluid-tight relationship with said wear ring cylindrical outer surface.

7. The sealed bearing assembly defined in claim 6 wherein the radial thickness of said first and second gaps are each from about 0.015 to about 0.040 inches.

8. The sealed bearing assembly defined in claim 7 wherein the axial length of each said gap is at least about 10 times its radial thickness.

9. The sealed bearing assembly defined in claim 1 wherein said stator tubular body portion comprises a resilient tubular element integrally formed with and projecting axially from said dust seal into said cup-shaped seal case.

10. The sealed bearing assembly defined in claim 9 wherein the radial thickness of said first and second gaps are each from about 0.015 to about 0.040 inches.

11. The sealed bearing assembly defined in claim 10 wherein the axial length of each said gap is at least about 10 times its radial thickness.

12. The sealed bearing assembly defined in claim 1 wherein said bearing cone comprises a cylindrical portion radially outboard of said inner race, and wherein said rotor comprises an annular rim mounted on said cone cylindrical portion for rotation therewith.

* * * * *